US 8,380,617 B1

(12) United States Patent
Shearer

(10) Patent No.: US 8,380,617 B1
(45) Date of Patent: Feb. 19, 2013

(54) CATASTROPHE LINKED MORTGAGE

(76) Inventor: Frederic G. Shearer, Essex (GB)

(*) Notice: Subject to any disclaimer, the term of this patent is extended or adjusted under 35 U.S.C. 154(b) by 800 days.

(21) Appl. No.: 12/146,557

(22) Filed: Jun. 26, 2008

Related U.S. Application Data

(63) Continuation of application No. 10/667,735, filed on Sep. 23, 2003, now abandoned.

(60) Provisional application No. 60/414,565, filed on Sep. 30, 2002.

(51) Int. Cl.
*G06Q 40/00* (2012.01)
(52) U.S. Cl. ............................... 705/38; 705/4
(58) Field of Classification Search .................. 705/4, 38
See application file for complete search history.

(56) References Cited

U.S. PATENT DOCUMENTS

| 4,831,526 A * | 5/1989 | Luchs et al. ................. 705/4 |
| 6,684,196 B1 * | 1/2004 | Mini et al. ................. 705/14.34 |
| 2003/0120588 A1 * | 6/2003 | Dodd et al. ................. 705/38 |
| 2004/0088203 A1 * | 5/2004 | Kakuwa et al. ................. 705/4 |

OTHER PUBLICATIONS

Struyk, Mortgage Default Insurance in the U.S.: Implications for Russia, Mar. 2002, The Urban Institute.*

* cited by examiner

*Primary Examiner* — Tran Nguyen
(74) *Attorney, Agent, or Firm* — Cook Alex Ltd.

(57) ABSTRACT

A method and computer system for providing financial hedge against the risk of loss to a mortgaged property resulting from natural or other catastrophe. The probability of loss is established by means of a knowledge-based expert system and would be a function of the location of the property but not of its underlying soil, age or structural characteristics. The extent of the protection is selected by the mortgagor to suit budgetary and other considerations. The probability and the portion to be subject to the arrangement would ultimately determine the charge. Upon the occurrence of the designated catastrophe, the selected portion of the debt is forgiven.

18 Claims, 5 Drawing Sheets

Catastrophe Linked Mortgage
Flow Chart for Setup

Catastrophe Linked Mortgage

Formative Process

Catastrophe Linked Mortgage Loan Agreement

Flow Chart

Catastrophe Linked Mortage

Comparison with Existing Scheme

| Parties Involved | Existing | Proposed |
|---|---|---|
| Dwelling | more or less unprotected* | protected by proposed feature in most cases** |
| Mortgagor | runs at least deductible and has inadequate coverage | has all of the selected cover without deductible |
| Initial Lender | ignores the problem and packages the loans for sale | is better able to market the loan due higher rate |
| Knowledge Based Expert System | no involvement in this chain of commerce | assigns credible probability to the selected parameters |
| Mortgage Guarantor | blesses 'qualifying' loans for securitisation | same but with concrete acknowledgement of the risk |
| Downstream Investors | buy loans and bear part of the risk by default | enjoy rates of interest comensurate with the risks borne |

Fig. 5

| Notes | *roughly 75% of homeowners in California elect not to buy earthquake insurance. The other 25% have a deductible of between 10% and 15% of the dwelling value, and have limits, some derisory, on each aspect of coverage. | **Provided an event falls within the parameters chosen, the full benefit of the feature would be immediately available to the mortgagor, who would then be in a position to raise cash for whatever purpose makes sense or simply to enjoy the lower monthly payments by virtue of the reduced balance. |

CATASTROPHE LINKED MORTGAGE

This application is a continuation of U.S. patent application Ser. No. 10/667,735, which was filed Sep. 23, 2003. This application also claims the benefit of U.S. Provisional Patent Application Ser. No. 60/414,565, filed Sep. 30, 2002. Both prior applications referred to above are incorporated herein by reference.

BACKGROUND OF THE INVENTION

The ability of the insurance mechanism to respond to the challenges of natural disasters has become increasingly questionable as the values exposed to such events grow. Because people increasingly choose to live and work in catastrophe prone areas, values thus exposed grow more rapidly than values overall. The shortcomings of the insurance industry will therefore grow as time goes on. To date they have been most apparent in the wake of disasters like the Northridge earthquake (Jan. 17, 1994 in Los Angeles) and Hurricane Andrew (Aug. 24, 1992, in southern Florida).

Simply stated, the insurance industry, as it is currently configured, deals badly with certain concentrations of risk. There are commercial, financial, regulatory and tax considerations which play a role in the inability of the insurance community to absorb these risks adequately. However, the main bottleneck is reinsurance, the means by which catastrophe exposures supposedly 'spread'. Reinsurance in fact has the opposite effect to that intended. Being a relatively small and arguably under-capitalized sector of the insurance industry, reinsurance depends on the appetite of its capital providers for volatility, and the use of reinsurance therefore has the effect of concentrating rather than spreading the risk. Following the strain of a major loss event, the price of reinsurance protection usually climbs sharply.

For example, in the case of the California Earthquake Authority, the chief provider of earthquake insurance for homeowners in California, the prices to be charged home owners for their coverage were initially calculated using the technical assessment of the susceptibility of properties in various parts of the state to loss as a result of earthquake. There was an additional provision made for the operating expenses. The CEA then determined the cost of the necessary reinsurance to protect their ability to respond to a loss. Because of the friction involved in concentrating earthquake exposure in the reinsurance community, the cost of purchasing reinsurance had the effect of virtually doubling the cost of coverage to consumers in certain very sensitive areas (according to a senior official in the Insurance Department at the time). This was because there was a "technical" price for the risk to be covered by reinsurers and a "commercial" price needed to convince reinsurers to take on yet more liability in a prospective event to which they were already heavily exposed. The difference between these two was large enough to double the cost to consumers.

RISK AS AN ASSET

In the wake of the two events mentioned above, the ensuing increase in the price of capacity served as the impetus for some fresh thinking. A new approach to the problem was the notion that risk could be viewed as an asset by virtue of yielding a stream of revenue (in the form of premium). This enabled the industry to create a bridge, so to speak, to financial markets.

Simply stated, an insurer (or a self insurer) would sell bonds with a coupon rate of "y" to raise a large sum of money and invest the proceeds in specified top quality fixed income securities, yielding a return of "x". These proceeds, held by a "Special Purpose Vehicle", would be repayable at maturity, unless the insurer were to suffer a specified loss before the maturity, in which case the investments would be liquidated to indemnify the insurer. The coupon rate of "y" would of course exceed "x" by an amount deemed the appropriate premium for the risk of the specified loss.

Such "Cat Bonds" have enabled large insurers to generate more protection for their balance sheets and have, to some extent, helped the insurance industry to address more adequately the challenge. They work to the extent that they parcel the exposure into very small and manageable pieces which can then be dispersed throughout the investment community—attaining real spread rather than concentration.

Cat Bonds are possible because the investment community is prepared to accept the assessment of certain specialists whose professional staff employ knowledge based expert systems to quantify the risks involved. In this way they are able to arrive at an acceptable value for "y" relative to "x". Furthermore, the investment community likes these instruments because the income is associated with a risk which is not correlated to the rest of their portfolios—that is: these instruments have a hedging function.

PROBLEMS WITH SECURITIZATION

There are serious limitations to securitization as practiced to date. The first snag is what is known as basis risk: that there may be a loss on a basis different than the one on which the instrument is arranged. In traditional insurance parlance—basis risk is the chance that the policy purchased will not cover the loss that happens. The range of application of the instruments depends after all on the investment community accepting the expert assessment of the probabilities involved rather than on the desires or needs of the buyer.

This basis risk issue arises because investors would not be interested in getting involved in the details of loss adjustment. This problem led the financiers of Disney's new venture in Tokyo to design an instrument (Concentric Ltd.) designating earthquakes of various magnitudes of which the epicentres are within certain distances of the project. This has been termed a "parametric trigger". Although the experts, in this case EQECAT, Inc., are obviously not in a position to predict these events, they can estimate the probability of each in terms which the financial community will accept as a basis for setting the difference between "y" and "x".

A further drawback is the cost of placing the instruments—lawyers for each party and investment bankers to underwrite the issue being the major components—making only relatively large efforts worthwhile. The usefulness of the whole concept is still limited to very large organizations of the scale of Disney (as mentioned above) and major insurers and reinsurers. This prevents the idea being of real benefit to the large majority of those who most need help with their exposures—except through a long and expensive chain of intermediaries.

Most important for this proposal, there remains the very considerable efficiency problem: each of these schemes involves a perceived need to set up a special vehicle and isolate capital—effectively to finance a single purpose insurance entity whose capital is equal to the total limits of the coverage in force. By any assessment, this is unjustifiably lavish use of capital.

SUMMARY OF THE INVENTION

In cases involving certain packaged secured loans, such as mortgage-backed securities, there is a much cheaper and simpler approach to the challenge—one which eliminates two of the three difficulties mentioned above. Moreover, individual borrowers, the mortgagors, could thereby avail themselves of the benefits of risk securitization. This has yet to be suggested, but would provide a major contribution to the management of certain risks that are largely ignored or badly handled under the current circumstances—from the standpoints of both price and availability. The best current example of such risks is that of earthquake damage to homes in many parts of California. Coverage is expensive for reasons discussed above. It is inadequate, for example requiring a prohibitive deductible (in many cases 10% to 15% of the building value) and offering derisory extra living expense. Consequently, most home owners, particularly those with heavily mortgaged properties, do not buy insurance for earthquake.

This proposed mortgage structure is distinct from and better than all the currently used devices by virtue of the following:

No additional capital is required. In fact there is no capital, existing or otherwise, needed to put the proposed feature in place;

No new obligation is incurred, since the proposed device uses an existing obligation;

Because of these two advantages, there are no security concerns;

There is no additional regulatory framework required;

No loss adjustment is involved, since damage is not relevant;

There would be no coverage disputes, since there is no coverage in the traditional sense;

The performance of the feature is triggered by an event independently identified and publicly announced by recognized authorities, e.g. USGS and CDMG;

Mortgagors will welcome an alternative to traditional insurance to protect against catastrophe loss;

The method provides real spread of risk by passing it via the initiating lenders to the downstream buyers of mortgage debt;

The product is available to all mortgagors, since the structural characteristics of the building and the nature of the subsoil are not factors;

The product is a contractual and financial framework which would deal more fairly and appropriately with risks currently largely ignored by mortgagors and mortgages alike;

There would be no deductibles;

The cost of protection and therefore of home ownership would be more stable and almost certainly reduced;

Additional cash would be freed for use in the areas and circumstances most appropriate and beneficial;

The protection can be tailored to the needs and circumstances of the individual homeowner, without the worries of deductible or insurance to value;

The investment community would have another class of volatility reducing and contra-cyclical securities;

The elimination of the entire traditional insurance structure would reduce the costs and streamline the delivery of the product from an administrative standpoint;

Mortgagors would avail directly themselves of the benefits of risk securitisation;

Mortgagors would be paying very near the technical price without the large multiplier imposed by the inefficiencies of the insurance and reinsurance bottleneck;

Because the feature would not constitute insurance, the cost would be interest, and accounted as such; and The proposed approach greatly reduces the need for traditional insurance thus freeing scarce capacity for the coverage of unencumbered risks and other related exposures.

BRIEF DESCRIPTION OF THE DRAWINGS

This invention is described more or less schematically in the following drawings wherein:

FIG. 5 is a tabular comparison of the proposed structure with the current state of the art from the viewpoint of the various participants.

DESCRIPTION OF THE PREFERRED EMBODIMENT

Figure 1:
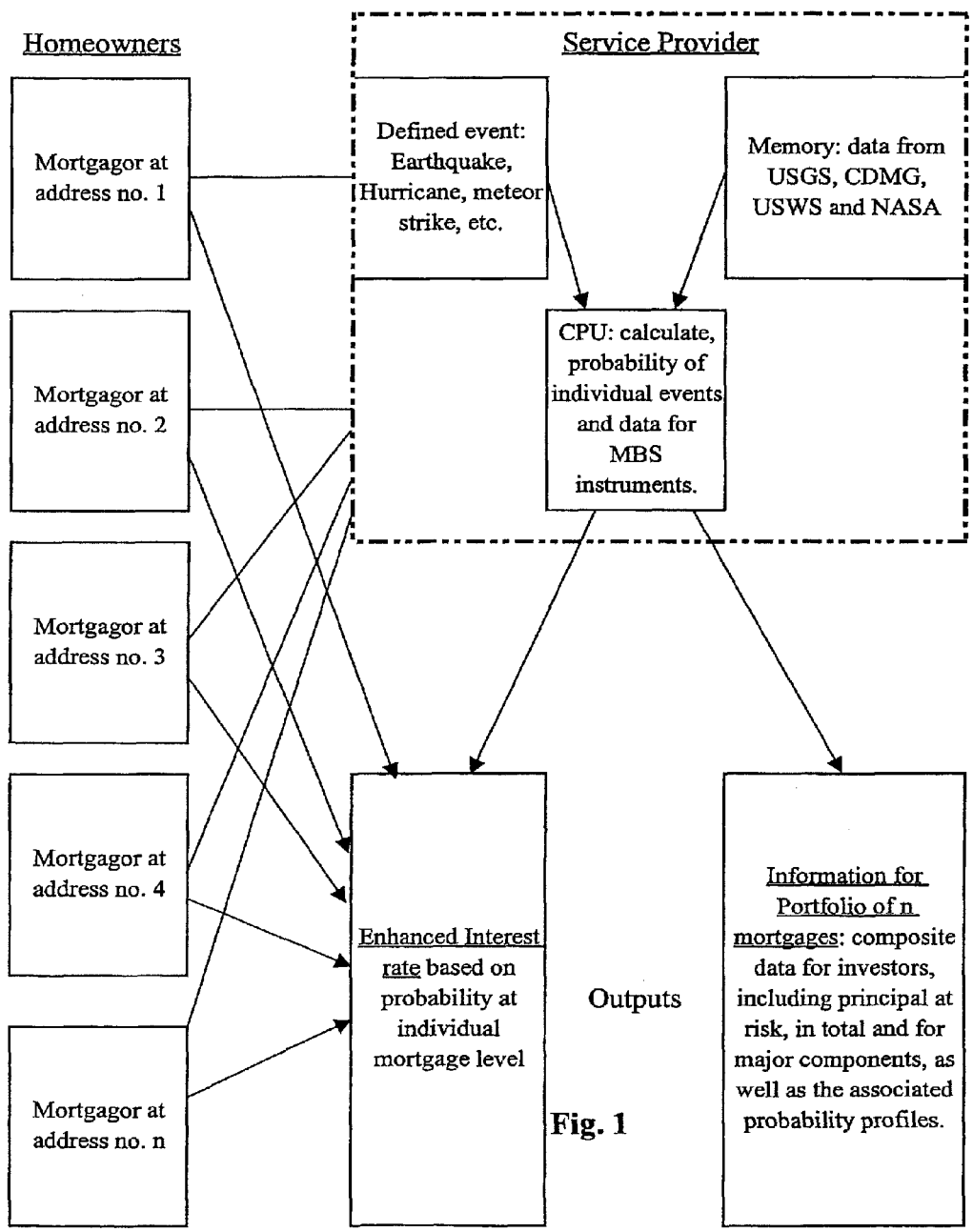
FIG. 1 is a flow chart illustration of the system of this invention.
Figure 2:
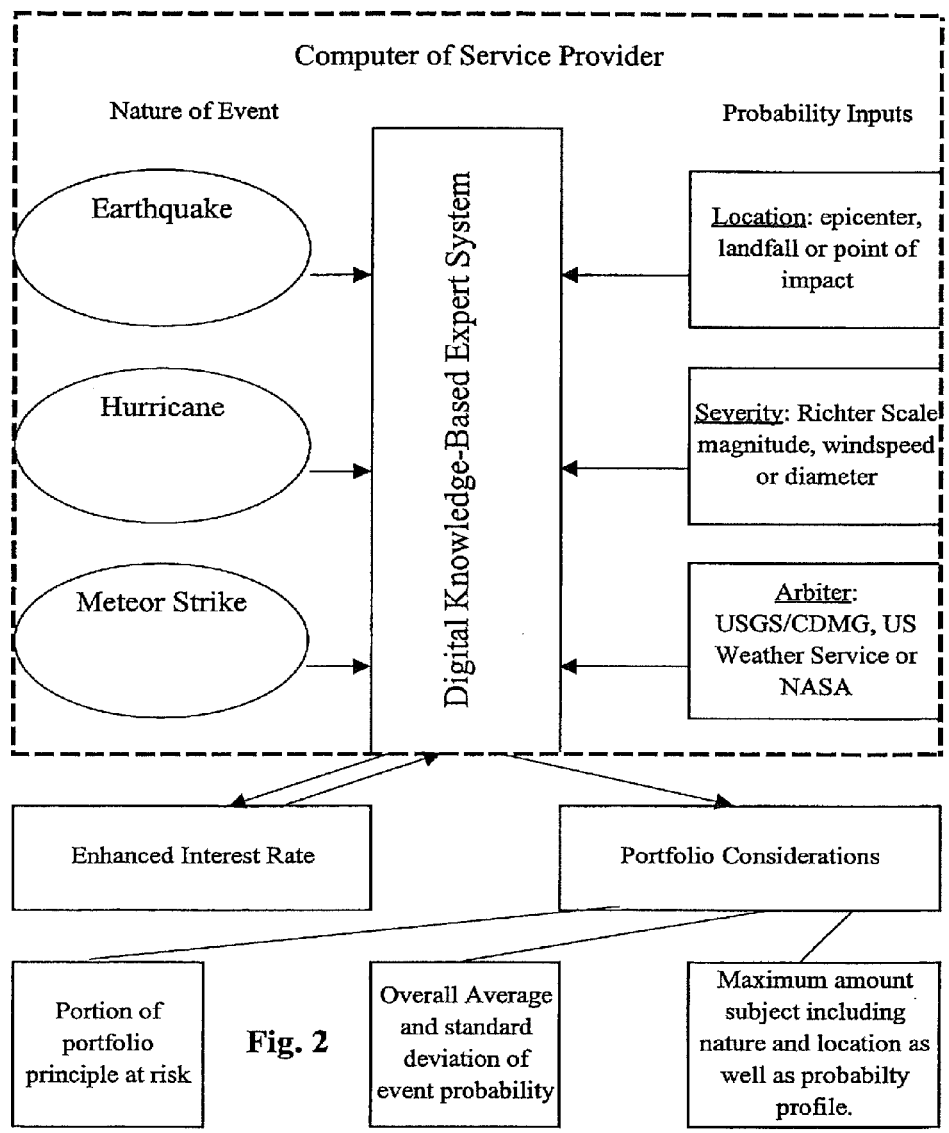
FIG. 2 is a computer flow chart for the digital generation of the interest rate and investment data with which the device operates.

The likelihood of the specified event is established in the computer of the service provider as depicted in FIG. 1 to the satisfaction of all the risk-assuming parties by a generally recognized knowledge-based expert system. There are a number of these, examples of which are those run by EQE, which was consulted for the setting of rates by the California Earthquake Authority, and Risk Management Solutions ("RMS"), both based in the San Francisco Bay Area. For natural disasters such as hurricane and earthquake, they use data from organizations such as the U S Weather Service, the U S Geological Survey, and the California Division of Mines and Geology. This enormous amount of authoritative data constitutes the knowledge which the experts use, with the help of computers, to generate theoretical probability of various occurrences. These probabilities are broadly accepted in the investment community. Given a specific location (in this case the exact address of the property securing the mortgage), a chosen severity (that force expected to generate damage) and the distance within which the event would need to occur—the systems will generate the associated probability as shown in FIG. 2. This will be credible with potential investors. Thus a homeowner arranging a mortgage on a home in the Marina district of San Francisco might be concerned that any earthquake within 75 riffles of a magnitude greater than 6.5 could damage the property and ask for a probability. His rebuilding costs might be only 35% of his mortgage amount; so in the event, he would probably ask to apply the clause to only 35% of the loan. The clause could apply to 35% of the outstanding principle or to the full 35% until the other 65% had been paid off. Although the use of the probability to determine an interest increment is a purely arithmetical procedure, it is also quite complex, given the additional considerations, and this step will also be in the context of the computer.

Figure 3:
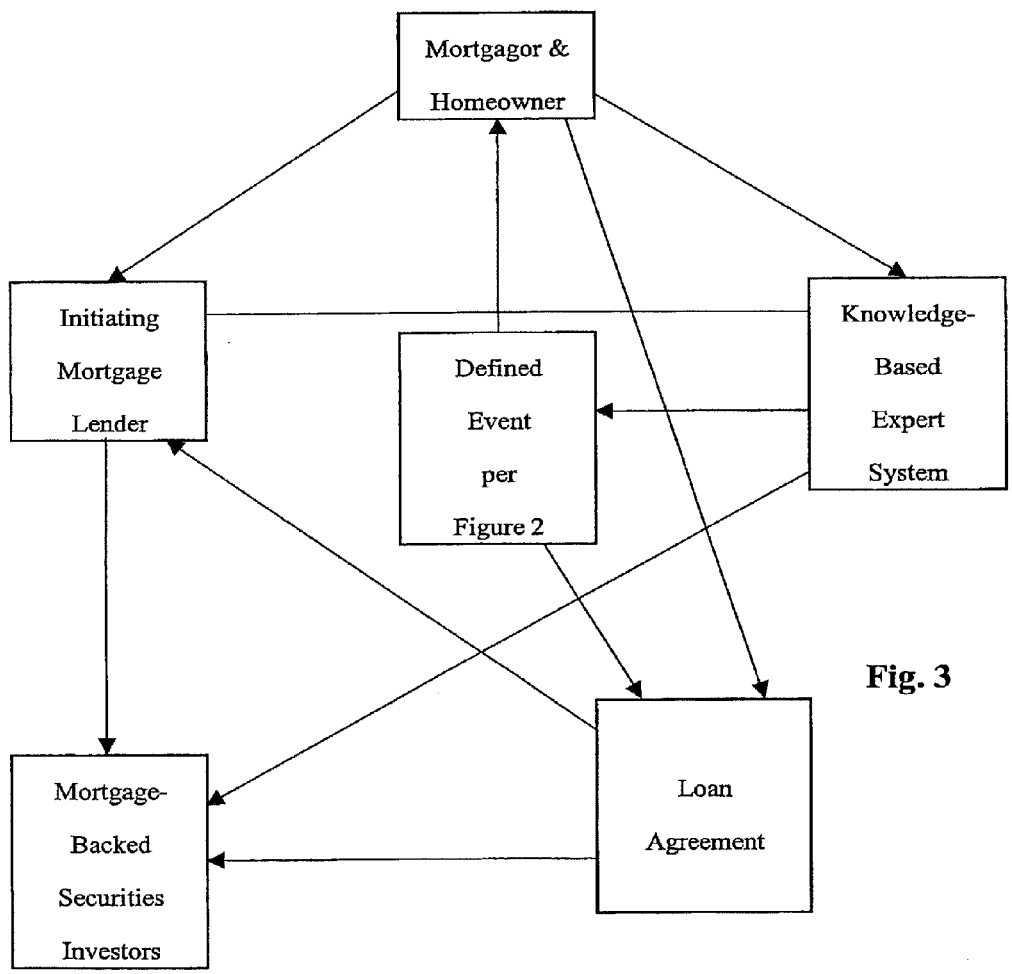
FIG. 3 is a diagram of the formative process by which one of the proposed mortgages would be arranged.

The formative process illustrated in FIG. 3 begins with a three-way conversation between the initiating lender, the expert system provider and the mortgagor to reach a determination regarding the parameters of the defined event which is to be written into the loan agreement. When that mortgage is eventually included in a portfolio of loans to securitized, the pertinent information for investors will doubtless include:

a) The identity of the expert system contractor;
b) The percentage of the portfolio principle thus 'linked';
c) Average and standard deviation of the probability generated by the 'linked' portion. If the 'linked' principle is subject on average to a 1% probability of loss, it could be that every such 'linked' dollar is equally exposed, but it could also be that some are exposed to a 2% probability. Some picture of this distribution would be useful to investors;

d) The proportion of the 'linked' principle which can be expected to be involved in the same event. In conjunction with c) above investors would probably want to know the largest portion of principle in one area and subject to the same sort of catastrophe. The expert system contractor would be able to provide a credible assessment of this aspect of the portfolio.

Figure 4:
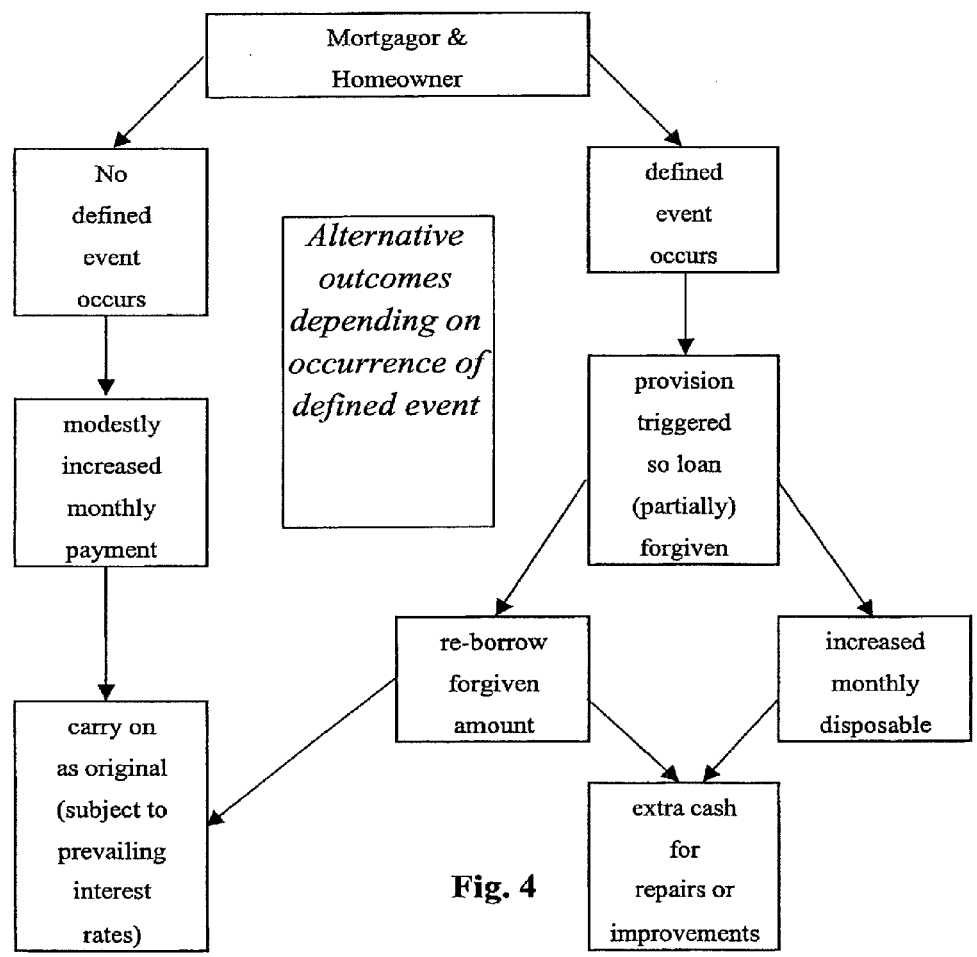
FIG. 4 is a flow chart for the two alternative outcomes: occurrence or non-occurrence of the defined event.

FIG. 4 tracks the alternative outcomes depending on whether the defined occurrence actually comes to pass. If it does, the agreed portion of the loan is forgiven, and the monthly payment, commensurately reduced. The mortgagor then has the happy choice—either merely enjoy the reduced monthly burden or enter into another loan to finance repairs or improvements, bringing the monthly payment back to its pre-catastrophe level or thereabouts.

FIG. 5, a tabular comparison with the current state of the art, contrasts the current and proposed mortgage structures from the point of view of each of the parties in the chain of commerce.

I claim:

1. A computer-based method for providing an owner of a defined parcel of real property upon which physical improvements have been made with a hedge against monetary loss to said physical improvements from the occurrence of a measurable, specific physically catastrophic event, including the steps of:

establishing a computer having a processor and a memory;

establishing in said computer memory a digital definition of a parametric trigger in the nature of the occurrence of a specific physically catastrophic event related to said defined parcel of real property upon which physical improvements have been made;

calculating in said computer processor connected to said memory the increase in mortgage interest rate above market interest rate to be paid by an owner of said defined parcel of real property who borrows money from a lender as evidenced by a written loan agreement and secured by a mortgage on said defined parcel of real estate based on said calculated probability of said specific physically catastrophic event occurring;

preparing a written loan agreement between said owner and said lender and a mortgage on said defined parcel of real property incorporating said calculated increased interest rate;

including in said loan agreement and said mortgage a provision wherein said lender terminates the obligation of said owner of said defined parcel of real property to repay at least a portion of the money remaining to be paid under said loan agreement upon the occurrence of said parametric trigger; and based on the occurrence of the parametric trigger, the lender forgiving a predetermined amount of the mortgage based on the provision in the mortgage.

2. The computer based method of claim 1 in which said step of establishing in said computer memory said digital definition of said parametric trigger including the step of limiting said digital definition to specific types of catastrophes.

3. The computer based method of claim 2 in which said step of establishing in said computer memory said digital definition of said parametric trigger includes the step of limiting said definition to catastrophes having defined physical characteristics.

4. The computer based method of claim 3 in which said step of establishing in said computer memory said digital definition of said parametric trigger limited to catastrophes having defined physical characteristics includes the further step of limiting said catastrophes to those which occur within a specified distance from said defined parcel of real property.

5. The computer based method of claim 3 in which said step of establishing in said computer memory said digital definition of said parametric trigger limited to catastrophes having defined physical characteristics includes the further step of limiting said catastrophes to those having physical characteristics of a defined magnitude of severity.

6. The computer based method of claim 3 in which said step of establishing in said computer memory said digital definition of said parametric trigger limited to catastrophes having defined physical characteristics includes the further step of limiting said catastrophes to those recognized by selected governmental or private agencies.

7. The computer based method of claim 1 in which said physically catastrophic event is a natural catastrophic event.

8. The computer-based method of claim 1 in which said step of calculating in said computer processor connected to said memory the increase in mortgage interest rate above market interest rate based on said calculated probability of said specific physically catastrophic event occurring is based on theoretical probabilities of various occurrences established by a generally recognized knowledge-based expert system.

9. A computer based system for providing an owner of a defined parcel of real estate upon which physical improvements have been made with a hedge against monetary loss to said physical improvements from the occurrence of a measurable, specific physically catastrophic event, said computer based system including:

a computer including a processor and a memory connected to said processor;

software to establish in said memory a parametric trigger in the nature of the occurrence of a specific physically catastrophic event related to said defined parcel of real property upon which physical improvements have been made;

software in said processor to calculate a rate of interest above the market interest rate based on the probability of said specific physically catastrophic event occurring;

software connected to said processor and said memory to prepare a written loan agreement between said owner and a lender and a mortgage on said defined parcel of real property incorporating said calculated increased interest rate and to include in said loan agreement and said mortgage a provision wherein said lender terminates, in whole or in part, the obligation of said owner of real property to repay the money remaining to be paid under said loan agreement upon the occurrence of said parametric trigger.

10. The computer based system of claim 9 in which said software to establish in said memory a parametric trigger in the nature of the occurrence of a specific physically catastrophic event includes software to limit such physically catastrophic events to specific types of physically catastrophic events.

11. The computer based system of claim 10 in which said software to limit said physically catastrophic events to specific types of physically catastrophic events includes software to limit said physically catastrophic events to those having defined physical characteristics.

12. The computer based system of claim 11 in which said software to limit said physically catastrophic events to those having defined physical characteristics includes software to limit said physically catastrophic events to those which occur within a specified distance from said defined parcel of real property.

13. The computer based system of claim 11 in which said software to limit said physically catastrophic events to those having defined physical characteristics includes software to limit said catastrophic events to those having a defined magnitude of severity.

14. The computer based system of claim 11 in which said software to limit said physically catastrophic events to those having defined physical characteristics includes software to limit said physically catastrophic events to those recognized by selected governmental or private agencies.

15. The computer based system of claim 9 in which said physically catastrophic event is a natural catastrophic event.

16. The computer based system of claim 9 in which said software in said processor to calculate a rate of interest above the market interest rate based on the probability of said specific physically catastrophic event occurring is based on theoretical probabilities of various occurrences established by a generally recognized knowledge-based expert system.

17. A computer-based method for terminating the obligation of an owner of a defined parcel of real property upon which physical improvements have been and which has been mortgaged under a written loan agreement from the obligation to repay at least a portion of the money remaining to be paid under said loan agreement upon the occurrence of a measurable, specific catastrophic event, including the steps of:

establishing a computer having a processor and a memory;

establishing in said computer memory a digital definition of a parametric trigger in the nature of the occurrence of a specific catastrophic event related to said defined parcel of real property upon which physical improvements have been made;

calculating in said computer processor connected to said memory the increase in mortgage interest rate above market interest rate to be paid by an owner of said defined parcel of real property who borrows money from a lender as evidenced by a written loan agreement and secured by a mortgage on said defined parcel of real estate based on said calculated probability of said specific catastrophic event occurring;

preparing a written loan agreement between said owner and said lender and a mortgage on said defined parcel of real property incorporating said calculated increased interest rate;

including in said loan agreement and said mortgage a provision wherein said lender terminates the obligation of said owner of said defined parcel of real property to repay at least a portion of the money remaining to be paid under said loan agreement upon the occurrence of said parametric trigger; and based on the occurrence of the parametric trigger, the lender forgiving a predetermined amount of the mortgage based on the provision in the mortgage.

18. The computer-based method of claim 17 in which said step of calculating in said computer processor connected to said memory the increase in mortgage interest rate above market interest rate based on said calculated probability of said specific catastrophic event occurring is based on theoretical probabilities of various occurrences established by a generally recognized knowledge-based expert system.

* * * * *